United States Patent [19]

Dieckmann et al.

[11] 4,440,674

[45] Apr. 3, 1984

[54] SYNERGISTIC VINYL HALIDE STABILIZER COMPOSITIONS OF ANTIMONY ORGANIC SULFUR-CONTAINING COMPOUNDS, ALKALINE EARTH CARBOXYLATES AND ALKALI METAL CARBONATES

[75] Inventors: Dale J. Dieckmann, Cleveland; Charles W. Fletcher, Highland Heights, both of Ohio

[73] Assignee: Dart Industries Inc., Northbrook, Ill.

[21] Appl. No.: 176,473

[22] Filed: Aug. 8, 1980

[51] Int. Cl.$^3$ .............................................. C08K 5/59
[52] U.S. Cl. ................. 524/177; 252/400 A; 524/282; 524/301; 524/382; 524/392; 524/424
[58] Field of Search ............. 260/23 XA, 23 H, 42.49, 260/45.75 B, 45.85 H, 45.85 S

[56] References Cited

U.S. PATENT DOCUMENTS

| | | |
|---|---|---|
| 2,680,726 | 6/1954 | Weinberg et al. |
| 2,684,956 | 7/1954 | Weinberg et al. |
| 2,981,717 | 4/1961 | Boultbee ...................... 260/45.85 S |
| 3,340,285 | 9/1967 | Remes et al. |
| 3,399,220 | 8/1968 | Remes et al. |
| 3,466,261 | 9/1969 | Mauz ............................. 260/45.75 |
| 3,530,158 | 9/1970 | Leebrick et al. |
| 3,887,508 | 6/1975 | Dieckmann ................... 260/23 XA |
| 3,919,168 | 11/1975 | Dieckmann. |
| 4,029,618 | 6/1977 | Dieckmann. |
| 4,115,352 | 9/1978 | Bohen ............................ 260/45.85 S |
| 4,158,640 | 6/1979 | Dieckmann. |
| 4,248,747 | 2/1981 | Washacheck .................. 260/23 H |
| 4,256,618 | 3/1981 | Brecker ......................... 260/23 XA |

FOREIGN PATENT DOCUMENTS 1044503 10/1966 United Kingdom.

*Primary Examiner*—Paul R. Michl

[57] ABSTRACT

A vinyl halide resin stabilizer composition which essentially contains:
(a) an antimony organic sulfur-containing compound, for example, antimony mercaptoacid esters, antimony alkyl mercaptides, and the like,
(b) an alkaline earth metal salt of a carboxylic acid, such as calcium stearate, and
(c) an alkali metal carbonate, such as sodium carbonate.

These compositions synergistically contribute to the dynamic processing stability of vinyl halide resin compositions. Rigid polyvinyl chloride compositions are stabilized against dynamic processing conditions of heat and shearing forces.

22 Claims, 1 Drawing Figure

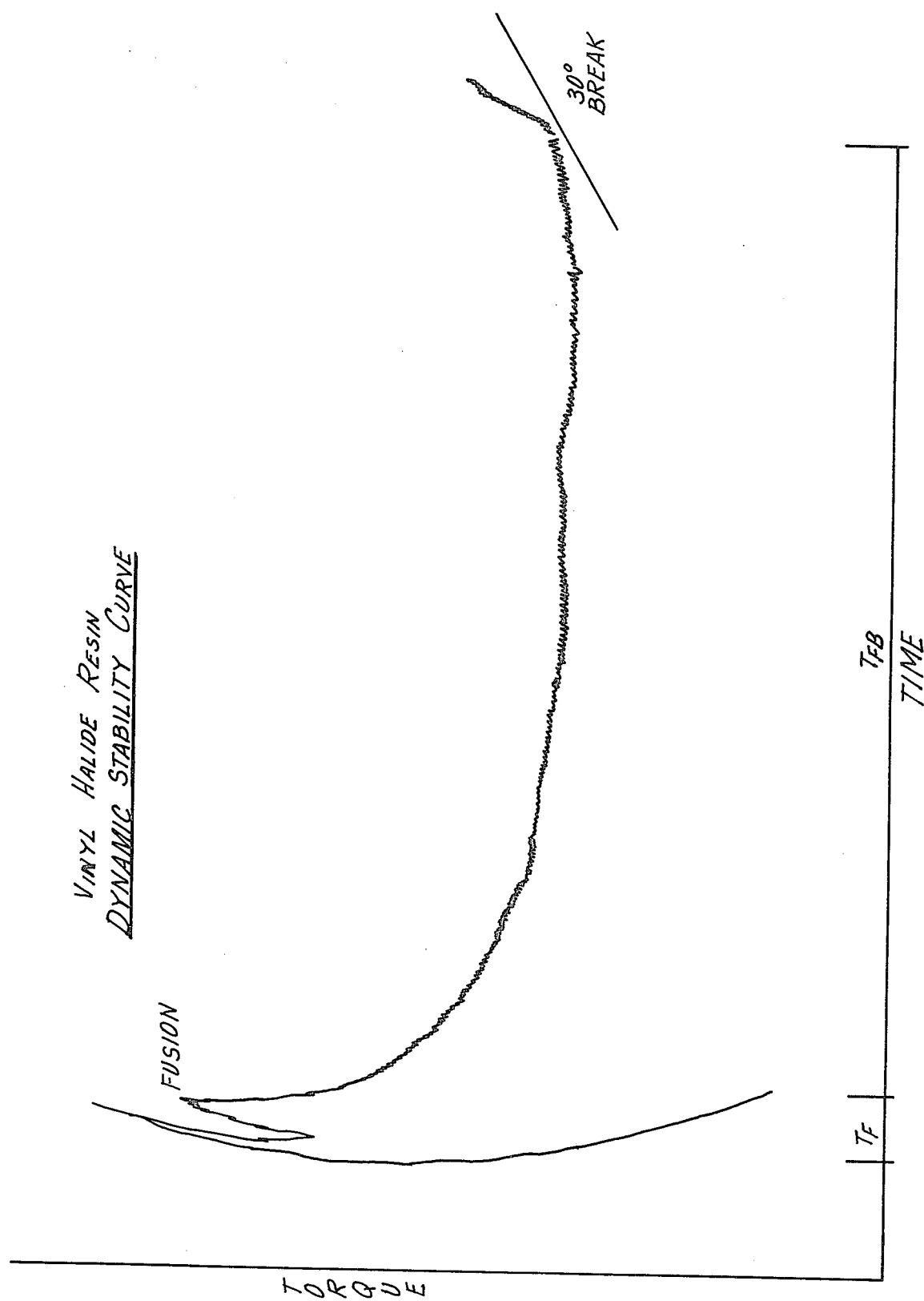

SYNERGISTIC VINYL HALIDE STABILIZER COMPOSITIONS OF ANTIMONY ORGANIC SULFUR-CONTAINING COMPOUNDS, ALKALINE EARTH CARBOXYLATES AND ALKALI METAL CARBONATES

BACKGROUND OF THE INVENTION

Antimony mercaptides have been proposed as stabilizers for vinyl halide resins to guard against degradation by heat during molding and working of the resins into useful articles. Prior art patents which disclose such antimony organic sulfur-containing compounds and their utility as stabilizers include U.S. Pat. Nos. 2,680,726; 2,684,956; 3,340,285; 3,399,220; 3,466,261 and 3,530,158. U.S. Pat. No. 3,887,508 to Dieckmann is directed to improvements in the utilization of antimony organic sulfur-containing compounds in combination with metal carboxylates. As also described in U.S. Pat. No. 3,919,168 to Dieckmann, certain metal phosphates can be combined with antimony compounds to achieve long term heat stability improvements in vinyl halide resins. U.S. Pat. Nos. 4,029,618 and 4,158,640 to Dieckmann further disclose synergistic heat stabilizer compositions of such antimony compounds as stabilizers and ortho-dihydric phenols.

SUMMARY OF THE INVENTION

The present invention is directed to further improvements in dynamic processing stabilization of resins, particularly vinyl halide resin compositions. According to the principles of this invention, vinyl halide resin stabilizer systems of antimony organic sulfur-containing compounds and other components synergistically enhance the processing stability of vinyl halide resins against degradation by shearing forces and heat. It has been demonstrated that such synergistic behavior far exceeds the expected sum of the individual components acting alone or in combinations other than the synergistic combinations disclosed, according to the features of this invention.

This invention is predicated in part upon the unexpected dynamic stabilization of vinyl halide resins in processing by antimony organic sulfur-containing compounds in combination with alkaline earth metal carboxylates and alkali metal carbonates. It has been found that synergistic processing stabilizations are provided by the combination of the three essential components of the stabilizer system in processing plastic or resinous materials under the conditions of normal processing shear rates and temperature. In other words, the sum of the stabilizing effects of an amount of each of the components alone upon the resin, or even two of the components in combination upon the resin, is indeed exceeded when the same amount of all three components are employed together in the vinyl halide resin formula. Such unexpected results, and other advantages are empirically illustrated in the numerous operating examples of this invention and a further understanding thereof will become apparent in view of the detailed description herein.

The antimony stabilizers according to this invention are especially suitable in the stabilization of vinyl halide resins such as polyvinyl chloride under dynamic processing conditions. In another particular aspect, when such vinyl halide resins are rigid, including those resins containing major amounts of filler such as calcium carbonate, or the like, it has been found that such rigid systems are effectively stabilized by the synergistic combinations of components in the antimony stabilizer systems of this invention. Furthermore, in other aspects, it has been discovered that minor amounts of a surfactant, particularly of the anionic class, when combined with the stabilizer system of this invention, also contribute to the processability of vinyl halide resins. Thus, the combination of components according to the principles of this invention provides very effective stabilizer compositions for processing vinyl halide resins in a very effective manner.

Broad ranges of components of the stabilizer compositions and components can be employed in this invention. Particularly useful stabilizer compositions of this invention are achieved with a total parts by weight range on the order of about 0.2 to about 10 parts by weight per 100 parts by weight (PHR) of the vinyl halide resin. There are also certain generally preferred weight ratios of the antimony organic sulfur-containing compounds relative to the alkaline earth metal carboxylate and the alkali metal carbonate. This will become apparent in view of the detailed operating examples. However, it is to be emphasized that the most desirable weight ratios of each of the essential components of the composition of this invention for a particular application in resin system can be arrived at in accordance with the teachings of this invention. Thus, in its broader aspects, this invention is not limited to weight ratios of components. It has been found that the synergistic stabilization levels of a particular antimony organic sulfur-containing compound, metal carboxylate or alkali metal carbonate will vary as exemplified herein. But most preferably, and in general, the relative amount of the antimony organic sulfur-containing compound is about 0.1 to about 3 parts by weight per 100 parts resin. Furthermore, the relative amount of alkaline earth metal carboxylate is about 0.1 to about 3 parts by weight per 100 parts resin and the alkali metal carbonate is about 0.1 to about 2 parts by weight per 100 parts resin. Where the composition further includes a filler such as calcium carbonate, such filler may be contained in amounts from about 5 to about 50 parts by weight per 100 parts resin. It has been determine that other components such as waxes or surfactants may be included in the vinyl halide resin compositions in order to improve the compatibility or dispersibility of the components. A typical wax would be paraffin wax as a vehicle for dispersion of stabilizer ingredients to improve dispersibility and compatibility of stabilizing ingredients. Surfactants, particularly of the anionic type, will be employed with vinyl halide resins for the purpose of improving compatibility of components and processing. For a further understanding of each of the components including the stabilizer systems of an antimony organic sulfur-containing compound, alkaline earth metal carboxylate and alkali metal carbonate, along with other components, reference is made to the following detailed description.

ANTIMONY ORAGNIC SULFUR-CONTAINING COMPOUND

The antimony organic sulfur-containing compounds which are of use in this invention are generally characterized as having the Sb - S group or linkage. Generally, most antimony organic compounds suitable for use in this invention are derived from trivalent antimony and include mercaptides which may be characterized by the following formula:

Formula I. Sb(SR)$_3$ wherein R represents hydrocarbon or substituted hydrocarbon radicals such as those selected from the group consisting of alkyl, aryl or aralkyl. Examples of such groups are alkyls such as ethyl, propyl, butyl, octyl, nonyl, lauryl and octadecyl; aryls and aralkyls such as phenyl, benzyl, naphthyl, xylyl or phenyl ethyl and the like. The group SR of Formula I, for instance, may be the rest of a mercaptan or mercapto alcohol. As indicated, aliphatic and aromatic mercaptans may be employed to form the group SR. In the case of aliphatic mercaptans, those having 8 to 18 carbon atoms, e.g., decyl or dodecyl mercaptan are usually preferred because the lower mercaptans are undesirable for the preparation and use of the stabilizers on account of their offensive smell. Suitable aromatic mercaptans are, for instance, thionaphthol, thiobenzyl alcohol, phenoxyethyl mercaptan, and others. As examples of suitable mercapto alcohols, monothioethylene glycol, monothiopropylene glycol, thioglycerol, thiodiethylen glycol, and others may be mentioned. Specific examples of such antimony mercaptides are antimony trilaurylmercaptide, antimony triphenylmercaptide and antimony tribenzylmercaptide. Patents exemplifying this formula Sb(SR)$_3$ or a similar formula and a definition of compounds represented thereby include U.S. Pat. Nos. 2,684,956 and 3,466,261, among others.

Antimony organic sulfur-containing compounds other than the antimony mercaptides of the Formula I above, are suitable for use according to this invention. Such compounds are generally termed antimony mercaptoacid esters which may be further defined by the following formula:

Formula II. Sb(SRCOOR')$_3$ wherein R is selected from the group consisting of alkylene, arylene, and aralkylene radicals and R' is a substituted or unsubstituted alkyl, aryl or mixed arylalyl group. Thus R may be derived from mercapto acetic, $\beta$-mercaptopropionic, thiomalic, thiosalicyclic acids, etc. Similarly, R' may be derived from decanols, glycerol, glycol, monoesters, dihydroabietyl alcohol, phenoxyethanol, pentaerythritol, etc. Readily available mercaptoacid esters are the esters of thioglycolic acid, such as ethyl thioglycolate, isooctylthioglycolate, and generally the esters of mono and dibasic aliphatic and aromatic mercapto acids, such as esters of $\beta$-tiopropionic acid, thiolactic acid, thiobutyric acid and mercaptolauric acid. Specific examples of antimony mercaptoacid esters include antimony tris(isooctylthioglycolate), antimony tris(glycoldimercaptoacetate), antimony tris(dodecylthioglycolate), dodecylmercaptoantimony bis(isooctylthioglycolate), and antimony tris(isooctyl-$\beta$-mercaptopropionate).

Particularly suitable are the esters of mercapto alcohols which are included in the above generalized formula and further defined by the more specific formula Sb—S—(CH$_2$)$_x$—OOCR where x is an integer, such as thioglycols, in which the hydroxy groups are esterified by an aliphatic, aromatic or alicyclic saturated or unsaturated monocarboxylic or dicarboxylic acid. Patents exemplifying Formula II, the above specific formula, or a similar formula, and a definition of compounds represented thereby include U.S. Pat. Nos. 2,680,726 and 3,530,158, among others.

The antimony organic sulfur-containing compounds having the Sb-S group represented by Formulas I and II come within the scope of a broader characterization illustrated by the following formula:

Formula III R$_n$SbX$_{3-n}$ wherein R is selected from the group consisting of alkyl, alkenyl, alkynyl, aryl, cycloalkyl, cycloalkenyl, and mixed aryl-alkyl, and substituted groups thereof, where X is selected from the group consisting of sulfide (sulfur) or mercaptide and n is an integer of 0 to 2. Of course, other X groups are SR and SRCOOR' defined by Formulas I and II above wherein R of the group SR is selected from alkyl, aryl, mixed aryl-alkyl, and substituted groups thereof, where R of the group SRCOOR' is selected from alkylene, arylene, aralkylene, and substituted groups thereof, wherein R' of the group SRCOOR' is selected from alkyl, aryl, mixed aryl-alkyl, and substituted groups thereof. This is also apparent, and with reference to the above incorporated U.S. Pat. No. 3,530,158, that when X is divalent, e.g., sulfide, the compound may be RSbX as exemplified hereinafter by n-butyl antimony sulfide where n of R$_n$ in Formula III is 1 and where n of X$_{3-n}$ is 2. It is therefore appreciated that the formulas herein are merely representative indicia of the class of antimony compounds which respond to the teachings of this invention. In the compounds, R$_n$SbX$_{3-n}$ which may be used in practice of this invention, R may be alkyl, cycloalkyl, alkenyl, cycloalkenyl, alkynyl, or aryl including such groups when inertly substituted. When R is alkyl, it may include methyl, ethyl, n-propyl, i-propyl, n-butyl, i-butyl, n-amyl, n-octyl, 2-ethylhexyl, etc. as well as substituted alkyls including phenylethyl, benzyl, etc. Typical alkenyl groups which may be employed may include vinyl, 2-propenyl (i.e., allyl), 1-propenyl, 1-butenyl, 2-butenyl, etc. as well as inertly substituted alkenyl groups typified by 4-phenyl, buten-1-yl, etc. Typical cycloalkyl groups may include cyclohexyl, cycloheptyl, cyclooctyl as well as inertly substituted cycloalkyl groups including 2-methyl cycloheptyl, 3-butyl cyclohexyl, 3-methylcyclohexyl, etc. Typical alkynyl groups which may be employed include propyn-1-yl, propyn-2-yl, butyn-1-yl, phenylethynyl, ethynyl, etc. Typical aryl groups which may be employed may include phenyl, tolyl, xylyl, chlorophenyl, dimethylaminophenyl, etc. Where more than one R or X is present in Formula III, such groups may be the same or different. Typical mercaptides include phenyl mercaptide, lauryl mercaptide, butyl mercaptide, or dimercaptides including aliphatic, cylcoaliphatic, or aromatic dimercaptans of the R groups disclosed herein, etc. Specific compounds when n is 1 or 2 include n-butyl antimony dilaurylmercaptide, n-butyl antimony sulfide, di-n-butyl antimony lauryl mercaptide, diphenyl antimony lauryl mercaptide, ditolyl antimony n-amyl mercaptide, dibenzyl antimony benzyl mercaptide, diallyl antimony cyclohexyl mercaptide, diphenyl antimony allylmercaptide, dicyclohexyl antimony n-hexyl mercaptide, ditolyl antimony phenyl mercaptide, di-isopropyl antimony 2-ethylhexyl mercaptide, di-p-chlorophenyl antimony n-butyl mercaptide, diphenyl antimony ethyl mercaptoacetate. Patents exemplifying such antimony compounds include U.S. Pat. Nos. 3,530,158 and 3,399,220. Where the R group is aryloxyl, alkyloxy, alkaryloxy, acyloxy, etc., specific examples from which this group is derived may include 2-ethylhexanol, phenol, nonylphenol, xylenol, 2-ethylhexoic acid, oleic acid, lauric acid, benzoic acid and the like. Of course, it is apparent that antimony mercaptides, antimony mercapto acids, antimony mercaptoacid esters, etc., per se form no part of this invention and the mentioned patents and their specific disclosures clearly teach these compounds and their method of production to enable anyone of ordinary skill to use them in carrying out this invention.

ALKALINE EARTH METAL CARBOXYLATE

The alkaline earth metal salts of carboxylic acids, including monocarboxylic as well as dicarboxylic acids, which are used in this invention are characterized by the formula:

Formula IV. $(RCXX)_nM$ wherein the group RCXX is the carboxylate and/or thiocarboxylate group of an aliphatic or aromatic mono or polyfunctional acid containing, for example, about $C_2$–$C_{54}$ carbon atoms; R is a hydrocarbon or substituted hydrocarbon radical; X is oxygen and/or sulfur; n is 2 and M is an alkaline earth metal, for example, magnesium, calcium, strontium and barium. These alkaline earth metal salts, or "carboxylates" as they are sometimes conveniently termed, have been widely developed in the art and are usually prepared by either a fusion or a double decomposition type reaction. In the direct fusion reaction, one equivalent of the organic acid is reacted with one equivalent of an alkaline earth metal oxide or hydroxide at elevated temperatures. In the double decomposition reaction or precipitation reaction, the alkali salt or the sodium salt of the organo carboxylic acid is reacted with an equivalent amount of alkaline earth chloride or sulfate in aqueous media. Reference may be had to literature for methods of preparation and other examples of these organic acid salts such as S. B. Elliott, "The Alkaline Earth and Heavy Metal Soaps," Reinhold Publishing Co., N.Y., 1946, McGraw-Hill Encyclopedia of Science and Technology, p. 393, Vol. 12, 1960; "Fatty Acids and Their Derivatives," A. W. Ralson, pp. 887–903, John Wiley & Sons, Inc., New York, 1948; "Fatty Acids and Their Industrial Applications, " E. Scott Pattison, pp. 209–220, Marcel Dekker, Inc., New York 1968; "The Stabilization of Polyvinyl Chloride," Fernand Chevassus, pp. 108–117, 137, St. Martin's Press, Inc., New York, 1968 and Mod. Chem., April–May pp. 1, 4, 6, 12 and 13 (1967).

The most useful metal salts of organic acids in accordance with the principles of this invention are those with lubricating characteristics such as the metal salts of fatty acids, more particularly, about $C_8$–$C_{32}$ monocarboxylic acids such as lauric and stearic acids; saponified synthetic fatty acids of about $C_{24}$–$C_{54}$ such as $C_{36}$ or $C_{54}$ dimer and trimer acids; and partially saponified ester waxes such as Hoechst Wax OP which is an ester of montan wax partially saponified with lime, e.g., $C_{28}$–$C_{32}$ carboxylic acids which are partially esterified with a dihydric alcohol and then saponified with lime to produce partially saponified ester waxes. Thus, a range of about $C_2$–$C_{54}$ carbon atoms for the acid is established by the above description.

The above cited literature references demonstrate that alkaline earth metal salts of carboxylic or thiocarboxylic acids and their methods of preparation have been widely developed in the art. Of course, these compounds per se as well as their methods of preparation form no part of this invention, and their employment in vinyl halide formulations as lubricating agents has heretofore been established. Specific examples of metal carboxylates for use in this invention include calcium stearate, calcium octoate, calcium laurate, barium laurate, barium stearate, magnesium stearate, barium octoate, and strontium stearate. Of course, combinations of the various cationic metals with the organic carboxylate groups can be employed such as barium/magnesium carboxylates, barium/calcium carboxylates and the like of any of the mentioned carboxylate ions. Similarly, aromatic carboxylates may be employed. These organic acids may contain nonhydrocarbon substituents such as hydroxyl, mercapto, thioglycol, alkoxy, and the like.

ALKALI METAL CARBONATE

The alkali metal carbonate may be sodium carbonate, potassium carbonate, or lithium carbonate. Both sodium carbonate and potassium carbonate have presently been found to provide synergistic results in the combination with the antimony and alkaline earth metal carboxylates. Such synergistic results and other advantages are empirically demonstrated in numerous operating examples of this invention, and a further understanding thereof will become apparent in view thereof.

Surfactants, as mentioned above, which have been found to improve the processability or compatibility of components are selected from the class of anionic agents, or mixtures thereof. These surfactants are soluble or dispersible in the resin melt. An anionic surfactant contains a negatively charged ion-containing portion and an oil dispersible cationic portion in the surfactant molecule as is well known. The surfactant of the anionic type may be (1) of the group of saponified fatty acids or soaps, or (2) of saponified petroleum oil such as sodium salts of organic sulfonates or sulfates or (3) of saponified esters, alcohols or glycols, with the latter being well known as anionic synthetic surfactants. Examples of these anionic surfactants include the alkaryl sulfonates or amine salts thereof such as sulfonates of dodecyl benzene or diethanolamine salt of dodecyl benzene sulfonic acid. Most of these sulfonates contain many chemical species. The class name given to most of them is "alkylaryl sulfonate". Simply, this means that a paraffinic hydrocarbon is bonded to an aromatic or benzene nucleus and the aromatic portion has been sulfonated. Examples of saponified fatty acids ($C_6$–$C_{24}$) are the sodium or potassium salts of myristic, palmitic, stearic, oleic or linoleic acids or mixtures thereof. It has been found that the alkali metal salts of fatty acid sulfates are very suitable surfactants such as sodium lauryl sulfate.

The principles of this invention and operating parameters will be further understood with reference to the following detailed examples which serve to illustrate the types of specific materials and their amounts as used in typical vinyl halide resin formulations and the synergisms displayed by the essential combination of components in the stabilizer composition according to this invention. These examples are considered to be exemplary of this invention, and should not be considered as limiting, especially in view of applicant's broad disclosure of principles of this invention.

In the examples which follow, a standard resin formula was employed which contained 100 phr of polyvinyl chloride homopolymer which is characterized as a white powder (Conoco 5385). Included in the standard resin formula is also 25 parts of calcium carbonate in powdered form (Atomite). Also included is 1.2 parts of petrolatum which is a lubricant. Finally in the standard formula is included 0.4 parts of sodium lauryl sulfate. To this standard formula, alkali metal carbonates, alkaline earth metal carboxylates, and antimony organic sulfur-containing compounds were added alone and in combination with the other components of the stabilizer compositions on a parts by weight basis. These resin mixtures were then processed on a Brabender Plasti-Corder. The Plasti-Corder is described in "Predicting the Processability of Plastics" by Walter T. Balke, C. W. Brabender Instruments, Inc., Bibliography #222, presented at the 1964 meeting of the Materials Division of the American Ordnance Association, Plastics Section, Dayton, Ohio, Sept. 23–24, 1964. The specific conditions of processing were: roller head type 6; temperature 195° C. for the mixing bowl; 80 rpm for blade speed and 60 grams resin formula charged to the mixing bowl.

A typical curve as a result of resin formula processing is shown in the drawing. The drawing typifies recording of melt viscosity of the rigid PVC resin formula directly from the Plasti-Corder as it is processed under constant conditions over a period of time. Referring to the drawing, a compaction stage takes place prior to the fusion point of the resin formula and this is typical of what is encountered in production extrusion processes. Then there is a steady state of viscosity which develops as time passes between the fusion time ($T_f$) and the fusion to break time ($T_{fb}$). The length of this steady state is an indication of the processing stability time. After the break, which is the point of degradation, there is a rising torque which is indicated in the drawing.

Employing the Brabender apparatus and conditions above described, a series of processing examples and curves were performed on single systems (Examples 1–8), on binary systems (Examples 9–21) and on the ternary systems (Examples 22–27). The results of each of these examples as processed on the Brabender apparatus upon being exposed to the conditions of shear and temperature are recorded. For each of the single, binary or ternary systems, a "stability time" or the time between the fusion to break time is recorded, as compensated for by the blank. "Blank" means the stability time ($T_{fb}$) of the unstabilized standard formula as defined above. All of these results are reported in Table I which follows.

TABLE I

| Additives (phr) | $T_{fb}$ - Blank (Minutes) |
|---|---|
| None | 0.0 |
| Single Components | |
| (1) 0.6 Na$_2$CO$_3$ | 0.5 |
| (2) 0.6 K$_2$CO$_3$ | 0.0 |
| (3) 2.2 CaSt$_2$ | 17.3 |
| (4) 2.2 CaLau$_2$ | 7.3 |
| (5) 2.2 MgSt$_2$ | 6.5 |
| (6) 0.6 Sb(IOTG)$_3$ | 1.0 |
| (7) 0.6 Sb(IOMP)$_3$ | 0.8 |
| (8) 0.6 Sb(LM)$_3$ | 1.5 |
| Binary Systems | |
| (9) 0.6 Na$_2$CO$_3$ + 2.2 CaSt$_2$ | 23.6 |
| (10) 0.6 Na$_2$CO$_3$ + 2.2 CaLau$_2$ | 11.0 |
| (11) 0.6 Na$_2$CO$_3$ + 2.2 MgSt$_2$ | 13.1 |
| (12) 0.6 Na$_2$CO$_3$ + 0.6 Sb(IOTG)$_3$ | 0.5 |
| (13) 0.6 Na$_2$CO$_3$ + 0.6 Sb(IOMP)$_3$ | 1.5 |
| (14) 0.6 Na$_2$CO$_3$ + 0.6 Sb(LM)$_3$ | 2.1 |
| (15) 0.6 K$_2$CO$_3$ + 2.2 CaSt$_2$ | 7.6 |
| (16) 0.6 K$_2$CO$_3$ + 0.6 Sb(IOTG)$_3$ | −0.1 |
| (17) 0.6 Sb(IOTG)$_3$ 30 2.2 CaSt$_2$ | 22.4 |
| (18) 0.6 Sb(IOTG)$_3$ + 2.2 CaLau$_2$ | 7.8 |
| (19) 0.6 Sb(IOTG)$_3$ + 2.2 MgSt$_2$ | 7.6 |
| (20) 0.6 Sb(IOMP)$_3$ + 2.2 CaSt$_2$ | 22.1 |
| (21) 0.6 Sb(LM)$_3$ + 2.2 CaSt$_2$ | 24.5 |
| Ternary Systems | |
| (22) 0.6 Na$_2$CO$_3$ + 2.2 CaSt$_2$ + 0.6 Sb(IOTG)$_3$ | 41.7 |
| (23) 0.6 Na$_2$CO$_3$ + 2.2 CaLau$_2$ + 0.6 Sb(IOTG)$_3$ | 15.1 |
| (24) 0.6 Na$_2$CO$_3$ + 2.2 MgSt$_2$ + 0.6 Sb(IOTG)$_3$ | 25.6 |
| (25) 0.6 Na$_2$CO$_3$ + 2.2 CaSt$_2$ + 0.6 Sb(IOMP)$_3$ | 61.1 |
| (26) 0.6 Na$_2$CO$_3$ + 2.2 CaSt$_2$ + 0.6 Sb(LM)$_3$ | 69.0 |
| (27) 0.6 K$_2$CO$_3$ + 2.2 CaSt$_2$ + 0.6 Sb(IOTG)$_3$ | 23.3 |

| KEY TO TABLE ABBREVIATIONS | |
|---|---|
| Chemical | Abbreviation |
| Na$_2$CO$_3$ | None |
| K$_2$CO$_3$ | None |
| Calcium Stearate | CaSt$_2$ |
| Calcium Laurate | CaLau$_2$ |
| Magnesium Stearate | MgSt$_2$ |
| Antimony bis(isooctylthioglycolate) | Sb(IOTG)$_3$ |
| Antimony bis(isooctylmercaptopropionate) | Sb(IOMP)$_3$ |
| Antimony bis(laurylmercaptide) | Sb(LM)$_3$ |

Referring to Table I, a clear demonstration is made for the synergistic activity of the three essential components of this invention, namely the antimony organosulfur-containing compound in combination with the alkali metal carbonate and alkaline earth metal carboxylate. For instance, it is demonstrated that in the case of an alkali metal carbonate, alone, as with potassium and sodium carbonate, little stability is imparted to the standard resin formula. With respect to the employment of the alkaline earth carboxylates such as calcium stearate or magnesium stearate or calcium laurate, a greater amount of stability is imparted to the standard resin formula between about 7 and about 17 minutes, for example. Similarly, when the antimony derivative is employed alone, whether it be the antimony-bis (isooctylthioglycolate) compound, antimony-bis (isooctylmercaptopropionate), or antimony-bis (laurylmercaptide), little stability is imparted, namely, about 1 minute when employed alone. When the results of the single components are compared to the binary systems, it may be observed that an improvement over the alkaline earth metal carboxylate is observed when the alkali metal carbonate is combined therewith. Compare, for instance, Examples 9–11 and 15 with Examples 1–5. The stability time, it may be observed, is increased over the individual components alone.

When the binary systems of the alkali metal carbonate with the antimony compounds are compared with the single systems of each of the components alone, it may be observed that there is essentially no real improvement for the binary system over the single components alone. However, when the binary systems of the antimony compound and alkaline earth metal carboxylates are compared to the individual components alone, there is again observed a slight improvement of the binary system over the additive effect of the individual components.

However, when the results of Table I for both single systems and binary systems are compared with the ternary systems of this invention, the stability time which is reported, as clearly shown, far exceeds the algebraic sum of the individual components. This is summarized in Table II.

TABLE II

SUMMARY STABILITY OF TERNARY SYSTEMS VS. BINARY AND SINGLE COMPONENTS

| Ternary Systems | Abbreviated Components | $T_{fb}$ - Blank (Minutes) |
|---|---|---|
| Example 22 | (Na/Ca/Sb) | 41.7 |
| $Na_2CO_3$ | (Na) + (Ca) + (Sb) | 18.8 |
| $CaSt_2$ | (Sb) + (Na/Ca) | 24.6 |
| $Sb(IOTG)_3$ | (Na) + (Ca/Sb) | 22.9 |
|  | (Ca) + (Na/Sb) | 17.8 |
| Example 23 | (Na/Ca/Sb) | 15.1 |
| $Na_2CO_3$ | (Na) + (Ca) + (Sb) | 9.8 |
| $CaLau_2$ | (Sb) + (Na/Ca) | 12.0 |
| $Sb(IOTG)_3$ | (Na) + (Ca/Sb) | 8.3 |
|  | (Ca) + (Na/Sb) | 7.8 |
| Example 24 | (Na/Mg/Sb) | 25.6 |
| $Na_2CO_3$ | (Na) + (Mg) + (Sb) | 8.0 |
| $MgSt_2$ | (Sb) + (Na/Mg) | 14.1 |
| $Sb(IOTG)_3$ | (Na) + (Mg/Sb) | 8.1 |
|  | (Mg) + (Na/Sb) | 7.0 |
| Example 25 | (Na/Ca/Sb) | 61.1 |
| $Na_2CO_3$ | (Na) + (Ca) + (Sb) | 18.6 |
| $CaSt_2$ | (Na/Ca) + (Sb) | 24.4 |
| $Sb(IOMP)_3$ | (Na) + (Ca/Sb) | 22.6 |
|  | (Na/Sb) + (Ca) | 18.8 |
| Example 26 | (Na/Ca/Sb) | 69.0 |
| $Na_2CO_3$ | (Na) + (Ca) + (Sb) | 19.3 |
| $CaSt_2$ | (Sb) + (Na/Ca) | 25.1 |
| $Sb(LM)_3$ | (Na) + (Ca/Sb) | 25.0 |
|  | (Ca) + (Na/Sb) | 19.4 |
| Example 27 | (K/Ca/Sb) | 23.3 |
| $K_2CO_3$ | (K) + (Ca) + (Sb) | 18.3 |
| $CaSt_2$ | (Sb) + (K/Ca) | 8.6 |
| $Sb(IOTG)_3$ | (K) + (Ca/Sb) | −0.1 |
|  | (Ca) + (K/Sb) | 17.8 |

For an understanding of the synergism involved in ternary systems employed in this invention with reference to the summary of results in Table II, particulate attention is directed to Example 22. Example 22 employs a ternary system of $Na_2CO_3$, $CaSt_2$ and $Sb(IOTG)_3$, to achieve a total stability of 41.7'. In comparison, referring to the stabilities of the single components from Table I, one would expect the algebraic sum of 18.1' because this is the sum of the periods of time obtained for each of these single components as represented by Examples 1, 3 and 6. In complete contrast, however, a stability of 41.7' was achieved for the ternary system of this invention. Therefore, this is a classical case of synergism where the result achieved for the ternary system far exceeds the algebraic sum which one would expect as the combined effect of the individual components, i.e., (Na)+(Ca)+(Sb) abbreviated in Table II. Comparisons of single components from Table I have also been made with the ternary systems of Examples 23-27 in the summarization of results in Table II. As one will understand, when the algebraic sum of the singular activity is compared to the stability achieved with the ternary systems of this invention, synergism is also demonstrated.

When the 41.7' stability of the ternary system is compared to even the stabilities of the binary components of the system, namely Examples 9, 12 and 17, it will be observed that approximately 22-24' are achieved for the combinations compared to a result of 41.7' stability for Example 22. Indeed, a synergistic result. With respect to Example 23, the ternary system of $Na_2CO_3$, $CaLau_2$ and $Sb(IOTG)_3$ produces a result of 15.1' stability which far exceeds the sum of the activity of the individual components alone. Even the binary systems are exceeded as represented by Examples 1, 4, 7, 10, 12 and 18. The same detailed comparisons may be made with respect to the synergistic ternary systems of Examples 24-27 wherein either $Na_2CO_3$ or $K_2CO_3$ is combined with magnesium or calcium stearate in the presence of an antimony compound, namely antimony bis-isooctylthioglycolate, antimony bis-isooctylmercaptopropionate and antimony bis-laurylmercaptide. Indeed, in each instance the stability of processing under conditions of heat and shear for the stabilizer composition according to this invention, far exceeds the expected algebraic sum of the activity of each of the individual components alone.

The results reported above for the standard resin formula have been repeated under the same conditions employing the resin alone without any additives and where the sodium carbonate, calcium stearate, or antimony isooctylthioglycolate where the components were added to the resin. Furthermore, binary systems of antimony with sodium carbonate and calcium stearate were employed along with other binary systems of sodium carbonate and calcium stearate. When the ternary systems of sodium carbonate, calcium stearate and antimony isooctylthioglycolate were employed even with the resin alone, stabilities are achieved which far exceed the expected results predicated upon the activity of the individual components alone. Wherefore, these results further substantiate the results of Table I. Accordingly, the above examples are merely illustrative of the synergistic combinations of ingredients in the stabilizer systems according to the principles of this invention. It is also to be understood that the stabilizer compositions of this invention and vinyl halide resins may include the presence of other ingredients which do not materially alter the novel and advantageous characteristics of this invention.

In each of the above examples, the vinyl halide resin which was employed is a homopolymer of vinyl chloride, i.e., polyvinyl chloride. It is to be understood, however, that this invention is not limited to a particular vinyl halide resin such as polyvinyl chloride. Other halogen-containing resins which are employed and illustrate the principles of this invention include chlorinated polyethylene, chlorinated polyvinyl chloride and the vinyl halide resin type. Vinyl halide resin, as understood herein, and as appreciated in the art, is a common term and is adopted to define those resins or polymers usually derived by polymerization or copolymerization of vinyl monomers including vinyl chloride with or without other comonomers such as ethylene, propylene, vinyl acetate, vinyl ethers, vinylidene chloride, methacrylate, styrene, etc. A simple case is the conversion of vinyl chloride $H_2C=CHCl$ to polyvinyl chloride $(CH_2—CHCl—)_n$ wherein the halogen is bonded to the carbon atoms of the carbon chain of the polymer. Other examples of such vinyl halide resins would include vinylidene chloride polymers, vinyl chloride-vinyl ester copolymers, vinyl chloride-vinyl ether copolymers, vinyl chloride-vinylidene, copolymers, vinyl chloride-propylene copolymers, and the like. Of course, the vinyl halide commonly used in the industry is the chloride, although others such as bromide and fluoride may be used. Examples of the latter polymers include polyvinyl bromide, polyvinyl fluoride, and copolymers thereof.

It is to be understood that the essential ingredients of the antimony organic sulfur-containing compound, metal carboxylate and alkali carbonate can be added separately. It is to be further understood that other components such as lubricants, processing aids, plasticizers, fillers, pigments, other stabilizers, other non-halogenated resins, etc., can be incorporated in the resin compositions and the benefits of this invention can be achieved. Accordingly, other modifications will become apparent in view of the teachings herein without departing from the true spirit and scope of this invention.

What is claimed is:

1. A vinyl halide resin composition which comprises a vinyl halide resin and, as a processing stabilizer, an effective amount of a composition consisting essentially of,
an antimony organic sulfur-containing compound having an Sb-S group, and mixtures thereof,
a metal carboxylate selected from the group consisting of an alkaline earth metal salt of a carboxylic or thiocarboxylic acid, and mixtures thereof, and
an alkali metal carbonate, said antimony compound, metal carboxylate and carbonate components in relative amounts which together provide a synergistic stabilizing effectiveness upon said resin.

2. The composition of claim 1 wherein said antimony compound is selected from the group consisting of an antimony mercaptide, antimony mercaptoacid, antimony mercaptoacid ester, antimony mercaptoalcohol and antimony mercaptoalcohol ester, and mixtures thereof.

3. The composition of claim 1 wherein said metal carboxylate is the carboxylic acid salt.

4. The composition of claim 3 wherein said acid is a fatty acid.

5. The composition of claim 1 wherein said acid contains about $C_2$–$C_{54}$ carbon atoms.

6. The composition of claim 1 wherein said acid is an aliphatic monocarboxylic acid which contains about $C_8$–$C_{32}$ carbon atoms.

7. The composition of claim 1 wherein the alkali metal carbonate is selected from the group consisting of sodium carbonate and potassium carbonate.

8. The composition of claim 1 containing an anionic surfactant.

9. The composition of claim 1 containing a hydrocarbon lubricant.

10. The composition of claim 1 wherein said vinyl halide resin is vinyl chloride-containing resin.

11. The composition of claim 1 wherein said effective amount is on the order of about 0.1 to about 10 parts by weight per 100 parts resin.

12. The composition of claim 1 wherein the relative amount of said antimony compound is about 0.1 to about 3 parts by weight per 100 parts resin and the relative amount of said carboxylate is about 0.1 to about 3 parts by weight per 100 parts resin, and said carbonate is about 0.1 to about 2.0 parts by weight per 100 parts resin.

13. A vinyl halide resin composition which comprises a vinyl halide resin and, as a processing stabilizer, an effective amount of a composition consisting essentially of,
an antimony organic sulfur-containing compound having the formula

where R of the formula is selected from the group consisting of alkyl, alkenyl, alkynyl, aryl, cycloalkyl, cycloalkenyl, mixed aryl-alkyl, and substituted groups thereof, where X of the formula is selected from the group consisting of sulfur, SR and SRCOOR', where R of the group SR is selected from alkyl, aryl, mixed aryl-alkyl, and substituted groups thereof, where R of the group SRCOOR' is selected from alkylene, arylene, aralkylene, and substituted groups thereof, wherein R' of the group SRCOOR' is selected from alkyl, aryl, mixed aryl-alkyl, and substituted groups thereof, where n is an integer of 0 to 2,
an alkaline earth metal carboxylate of a fatty acid, and
an alkali metal carbonate, said antimony compound, metal carboxylate and carbonate components in relative amounts which together provide a synergistic stabilizing effectiveness upon said resin.

14. The composition of claim 13 wherein said resin is polyvinyl chloride.

15. A rigid vinyl halide resin composition which comprises a vinyl halide resin and, as a processing stabilizer against degradation by heat and shear, an effective amount of a composition consisting essentially of,
an antimony organic sulfur-containing compound selected from the group consisting of antimony tris (isooctylthioglycolate), antimony tris (laurylmercaptide), antimony tris (isooctylmercaptopropionate), dodecylmercaptoantimony bis (isooctylthioglycolate), antimony tris (glycoldimercaptoacetate), antimony tris (dodecylthioglycolate), and mixtures thereof,
calcium stearate, and
sodium carbonate, said antimony compound, metal carboxylate and carbonate components in relative amounts which together provide a synergistic stabilizing effectiveness upon said resin.

16. The composition of claim 15 containing an anionic surfactant.

17. The composition of claim 15 containing sodium lauryl sulfate.

18. The composition of claim 15 further containing calcium carbonate.

19. A rigid vinyl halide composition comprising:
polyvinyl chloride,
an antimony organic sulfur-containing compound selected from the group consisting of antimony tris (isooctylthioglycolate), antimony tris (laurylmercaptide), antimony tris (isooctylmercaptopropionate), dodecylmercaptoantimony bis (isooctylthioglycolate), antimony tris (glycoldimercaptoacetate), antimony tris (dodecylthioglycolate), and mixtures thereof,
calcium stearate,
sodium carbonate, and
wherein the relative amount of said antimony compound is about 0.1 to about 3 parts by weight per 100 parts resin and the relative amount of said carboxylate is about 0.1 to about 3 parts by weight per 100 parts resin, and said carbonate is about 0.1 to about 2.0 parts by weight per 100 parts resin.

20. The composition of claim 19 containing calcium carbonate in an amount of from about 3 to about 50 parts by weight per 100 parts resin.

21. An article formed from the composition of claim 1, 19 or 20.

22. A pipe formed from the composition of claim 19 or 20.

* * * * *